United States Patent [19]
Herlihy

[11] Patent Number: 5,553,267
[45] Date of Patent: Sep. 3, 1996

[54] METHOD AND APPARATUS FOR COORDINATING ACCESS TO AND MODIFYING MULTIPLE ELEMENT DATA OBJECTS IN A SHARED MEMORY

[75] Inventor: Maurice P. Herlihy, Brookline, Mass.

[73] Assignee: Digital Equipment Corporation, Maynard, Mass.

[21] Appl. No.: 907,330

[22] Filed: Jul. 1, 1992

[51] Int. Cl.$^6$ ............................ G06F 13/00; G06F 13/18; G06F 13/42

[52] U.S. Cl. .................... 395/474; 395/480; 395/482; 395/478; 364/134; 364/228.1; 364/246.2; 364/246.3; 364/931.46; 364/931.48; 364/DIG. 1; 364/DIG. 2

[58] Field of Search ........................... 395/425, 600, 395/474, 478, 481, 482, 497.04, 456, 457, 468, 480, 485; 364/134

[56] References Cited

U.S. PATENT DOCUMENTS

| | | | |
|---|---|---|---|
| 4,410,944 | 10/1983 | Kronies | 395/474 |
| 5,428,761 | 6/1995 | Herlihy et al. | 395/457 |

*Primary Examiner*—Glenn Gossage
*Attorney, Agent, or Firm*—Arnold, White & Durkee

[57] ABSTRACT

A method and apparatus for improved access to shared memory of an electronic computing system supporting load_linked and store_conditional machine operations. Data objects in the shared memory are referenced by root pointers of an object directory of the shared memory. Each data object is associated with a check[0] counter and a check[1] counter. A processor first reads the root pointer and the data object's check[0] counter, then copies the data object to a scratch area of memory associated with that processor, the scratch area also having check[0] and check [1] counters associated therewith. The processor then reads the data object's check[1] counter. If the data object's check[0] and check[1] counters are unequal, the processor performs an exponential "back-off" by waiting for a randomly selected period of time before attempting to access the data object again. When the data object is successfully read, the scratch area's check[1] counter is incremented, the data object in the scratch area is modified as desired, and the scratch area's check[0] counter is incremented. A load_ linked operation is then used to read the root pointer, and the data object's check[0] and check[1] counters are read. If the data object's check[0] and check[1] counters match and the root pointer has not been modified since the processor first read it, a store-conditional operation is attempted. If the store_conditional is unsuccessful, exponential back-off is performed, and the routine is re-started. Otherwise, the store_conditional succeeds in "swinging" the root pointer to the modified object, and the routine ends. A new scratch area may be established in the shared memory by utilizing the elements of the old data object that were changed.

22 Claims, 5 Drawing Sheets

METHOD AND APPARATUS FOR COORDINATING ACCESS TO AND MODIFYING MULTIPLE ELEMENT DATA OBJECTS IN A SHARED MEMORY

FIELD OF INVENTION

The present invention relates to a system for accessing shared computer memory. More particularly, the invention relates to a non-blocking system for multiple processors that support load_linked and store_conditional machine operations to concurrently and efficiently access shared memory.

BACKGROUND OF INVENTION

A data "object", also called a data "structure", is typically thought of as related data stored in a number of computer memory locations, where the memory locations are associated with each other. Data objects are sometimes "shared", meaning more than one processor has access to the data objects. Synchronizing access to shared data objects is one of the oldest and most difficult problems in designing software for computers having multiple processors that access shared memory. Without careful synchronization, a data object may be left in an "inconsistent" state if different processors try to modify it at the same time. For example, if a first processor begins modifying a data object and a second processor modifies that data object before the first processor has finished its modifications, the data object will be left in an "inconsistent" state. Conventional techniques for synchronizing access to shared data objects in shared-memory multi-processor computers involve mutual exclusion protocols where each data object has an associated lock. Before a processor can access a data object, it must acquire the lock; as long it holds that lock, no other processor may access the data object. Such locks are used, either explicitly or implicitly, in most programming language constructs proposed for concurrent memory access by multiple processors (Andrews et al, "Concepts and Notations for Concurrent Programming," Association for Computing Machinery (ACM) Computing Surveys, Vol. 15, No. 1, pp. 3–43, March 1983).

Early locking algorithms used load and store operations (see Dijkstra, "Co-operating Sequential Processes," pp. 43–112, Academic Press, New York, 1965; Knuth, "Additional Comments on a Problem in Concurrent Programming Control" Communications of the ACM, Vol. 9, No. 5, pp. 321–322, May 1966; Peterson, "Myths About the Mutual Exclusion Problem," Information Processing Letters, Vol. 12, pp. 115–116, June 1981; and Lamport, "A New Solution of Dijkstra's Concurrent Programming Problem," Communications of the ACM, Vol. 18, No. 8, pp. 453–455, August 1974).

Many researchers have studied the problem of constructing wait-free "atomic registers" from simple machine operations (see B. Bloom, "Constructing Two-Writer Atomic Registers", Proceedings of the Sixth ACM Symposium an Principles of Distributed Computing, pp. 249–259, 1987; J. E. Burns and G. L. Peterson, "Constructing Multi-Reader Atomic Values From Non-Atomic Values", Proceedings of the Sixth ACM Symposium on Principles of Distributed Computing, pp. 222–231, 1987; L. Lamport, "Concurrent Reading and Writing, Communications of the ACM", Volume 20, No. 11, pp. 806–811, November 1977; L. Lamport, "On Interprocess Communication, Parts i and ii", Distributed Computing, Vol. 1, pp. 77–101, 1986; R. Newman-Wolfe, "A Protocol For Wait-Free, Atomic, Multi-Reader Shared Variables, ""Proceedings of the Sixth ACM Symposium on Principles of Distributed Computing, "pp. 232–249, 1987; G. L. Peterson, "Concurrent Reading While Writing", ACM Transactions on Programming Languages and Systems, Vol. 5, No. 1, pp. 46–55, January 1983; G. L. Peterson and J. E. Burns, "Concurrent Reading While Writing ii: the Multi-Writer Case", Technical Report GIT-ICS-86/26, Georgia Institute of Technology, December 1986; A. K. Singh, J. H. Anderson, and M. G. Gouda, "The Elusive Atomic Register Revisited", Proceedings of the Sixth ACM Symposium on Principles of Distributed Computing, pp. 206–221, 1987). "Atomic registers" are memory registers that are in effect modified instantaneously, so that there is no danger of two or more processors leaving the register in an inconsistent state. Atomic registers, however, are not very useful for use with concurrent multi-register data objects, since atomic registers typically comprise a single register, and they cannot be combined to construct non-blocking or wait-free data objects.

A number of machine operations more powerful than the "load" and "store" operations have been used to construct concurrent data objects. For example, one application has used a highly concurrent queue implementation based on the "replace-add" operation, a variant of the "fetch&add" operation (A. Gottlieb, B. D. Lubachevsky, and L. Rudolph, "Basic Techniques For the Efficient Coordination of Very Large Numbers of Cooperating Sequential Processors," ACM Transactions on Programming Languages and Systems, Vol. 5, No. 2, pp. 164–189, April 1983). This implementation permits concurrent enqueing and dequeing processes, but it is blocking since it uses critical sections to synchronize access to individual queue elements. Another application has utilized a wait-free queue implementation that permits one enqueing process to execute concurrently with one dequeing process (L. Lamport, "Specifying Concurrent Program Modules", ACM Transactions on Programming Languages and Systems, Vol. 5, No. 2, pp. 190–222, April 1983).

Other applications have developed locking algorithms for concurrent B-trees (see R. Bayer and M. Schkolffick, "Concurrency of Operations on B-Trees", Acta Informatica, Vol. 1, No. 1, pp. 1–21, 1977; P. L. Lehman and S. B. Yao, "Efficient Locking For Concurrent Operations on B-Trees", ACM Transactions on Database Systems, Vol. 6, No. 4, pp. 650–670, December 1981; Y. Sagiv, "Concurrent Operations on B-Trees With Overtaking", ACM Principles of Database Systems, pp. 28–37, January 1985) and for related search structures (see J. Biswas and J. C. Browne, "Simultaneous Update of Priority Structures", Proceedings of the 1987 International Conference on Parallel Processing, pp. 124–131, 1987; C. S. Ellis, "Concurrent Search and Insertion in 2–3 Trees", Acta Informatica, Vol. 14, pp. 68–86, 1980; R. Ford and J. Calhoun, "Concurrency Control Mechanisms and the Serializability of Concurrent Tree Algorithms", 3rd ACM Symposium on Principles of Database Systems, pp. 51–60, 1984; L. Guibas and R. Sedgewick, "A Dichromatic Framework for Balanced Trees", 19th ACM Symposium on Foundations of Computer Science, pp. 8–21, 1978; D. W. Jones, "Concurrent Operations on Priority Queues", Communications of the ACM, Vol. 32, No. 1, pp. 132–137, January 1989). Efficient wait-free solutions to the union-find problem in a shared-memory architecture have also been studied (R. J. Anderson and H. Woll, "Wait-Free Parallel Algorithms for the Union Find Problem", Proceedings of the 23rd Annual ACM Symposium on Theory of Computing, pp. 360–370, May 1991).

Nevertheless, locking is poorly suited for modern shared-memory multi-processor architectures, for several reasons.

First, locking is poorly suited for applications in which one processor must modify multiple data objects, particularly if the set of objects to be modified is not known in advance. Care must be taken to avoid deadlocks that arise when different processors attempt to acquire the same locks in different orders. Second, if the processor holding a lock is de-scheduled, perhaps by exhausting its scheduling quantum, by a page fault, or by some other kind of interrupt, then other processors capable of running may be unable to progress. Third, locking interacts poorly with priority systems. A lower-priority process may be preempted in favor of a higher-priority process, but if the preempted process is holding a lock, then other, perhaps higher priority processes will be unable to progress; this phenomenon is sometimes called "priority inversion". Finally, locking can produce "hot-spot" contention. In particular, spin locking techniques, in which processes repeatedly poll a lock until it becomes free, perform poorly because of excessive memory contention.

In contrast to applications that use locks, a concurrent object implementation is "non-blocking" if a processor is guaranteed to complete an operation after the system as a whole takes a finite number of steps; this is referred to as "atomicity." Non-blocking implementations are not consistent with the use of locking, since a process that halts while holding a lock might force other processes trying to acquire that lock to run forever without making progress.

Many conventional machine operations used for synchronization are provably inadequate for lock-free synchronization. It is impossible to construct non-blocking or wait-free implementations of many simple and useful data types using any combination of "read", "write", "test&set", "fetch&add", and "memory-to-register swap" operations (see M. P. Herlihy, "Impossibility and Universality Results for Wait-Free Synchronization", Seventh ACM Special Interest Groups SIGA CT-SIGOPS Symposium on Principles of Distributed Computing, August 1988).

Early work on non-blocking protocols focused on impossibility results, showing that certain problems cannot be solved in asynchronous systems using certain machine operations (see B. Chor et al. "On Processor Coordination Using Asynchronous Hardware", Proceedings of the Sixth ACM Symposium on Principles of Distributed Computing, pp. 86–97, 1987; Dolev et al., "On the Minimal Synchronism Needed for Distributed Consensus", Journal of the ACM, Vol. 34, No. 1, pp. 77–97, January 1987; Dwork et al., "Consensus in the Presence of Particle Synchrony," Journal of the ACM, Vol. 35, No. 2, pp. 228–323, April 1988; Dwork et al., "Flipping Persuasively in Constant Expected Time", Twenty-Seventh Annual Symposium on Foundations of Computer Science, pp. 222–232, October 1986; Fischer, "Impossibility of Distributed Commit With One Faulty Process", Journal of the ACM, Vol. 32, No. 2, April 1985; M. P. Herlihy, "Impossibility and Universality Results For Wait-Free Synchronization", Seventh ACM SIGACT-SIGOPS Symposium on Principles of Distributed Computing, August 1988.)

A machine operation is said to be "universal" if it can be used to transform any sequential object implementation into a wait-free concurrent implementation. Universality of machine operations is examined in M. Fischer et al., "Impossibility of Distributed Commit With One Faulty Process", Journal of the ACM, Vol. 32, No. 2, April 1985; M. P. Herlihy, "Impossibility and Universality Results For Wait-Free Synchronization," Seventh ACM SIGA CT-SIGOPS Symposium on Principles of Distributed Computing, August 1988; and S. A. Plotkin, "Sticky Bits and Universality of Consensus," Proceedings of the Eighth ACM Symposium on Principles of Distributed Computing, pp. 159–176, 1989. Although these implementations are useful in theory, they are limited from the standpoint of practicality.

One application of universal machine operations is M. P. Herlihy and J. Wing, "Axioms For Concurrent Objects," 14th ACM Symposium on Principles of Programming Languages", pp. 13–26, January 1987, which involves a non-blocking queue implementation that uses the "fetch&add" and "swap" operations to permit an arbitrary number of enqueing and dequeing processes. "Compare&swap" is another universal machine operation, and was first introduced by the International Business Machines ("IBM") Corporation (Armonk, N.Y.), in the IBM 370 architecture (see IBM, "System/370 Principles of Operation", Order Number GA22-7000). Another article relates to a technique for transforming stylized sequential object implementations into non-blocking and wait-free implementations using the "compare&swap" machine operation (M. P. Herlihy, "A Methodology For Implementing Highly Concurrent Data Structures", Proceedings of the Second ACM SIGPLAN Symposium on Principles and Practice of Parallel Programming, pp. 197–206, March 1990). Other universal operations similar to the compare&swap operation exist (see V. Lanin and D. Shasha, "Concurrent Set Manipulation Without Locking", Proceedings of the Seventh ACM Symposium on Principles of Database Systems, pp. 211–220, March 1988).

Other known universal machine operations are the "load_linked" and "store_conditional" operations, which are closely related to the compare&swap machine operation. For a collection of synchronization and memory management algorithms based on compare&swap, see M. P. Herlihy, "A Methodology For Implementing Highly Concurrent Data Structures", Proceedings of the Second ACM SIG-PLAN Symposium on Principles and Practice of Parallel Programming, pp. 197–206, March 1990. The load_linked and store_conditional machine operations were first proposed as part of the S-1 project at Lawrence Livermore Laboratories, and are currently supported in the MIPS-II architecture. (MIPS Technology, Inc., San Francisco, Calif., "The MIPS Reduced Instruction Set Computer RISC) Architecture.") The load_linked and store_conditional machine operations are theoretically universal, since they are powerful enough to transform any sequential object implementation into a non-blocking or wait-free implementation.

The load_linked operation copies the value of a one-word shared memory variable to a local variable. After a load_linked operation, a store_conditional operation is performed. The store_conditional operation functions to store a new value in the shared memory variable only if no other processor has modified the shared memory variable since the load_link operation occurred. Thus, if the load_linked/store_conditional pair successfully changes the shared memory variable, the operation is "atomic"; in particular, the operation successfully changed the variable without any interference from other processors, and is considered to have occurred instantaneously with respect to the other processors.

Another method used to execute memory transactions without synchronization is the "optimistic" concurrency control technique (H. T. Kung and J. T. Robinson, "On Optimistic Methods For Concurrency Control", ACM Transactions on Database Systems, Vol. 2, No. 6, pp. 213–226, June 1981). These transactions execute without synchronization but each transaction must be validated before it is allowed to commit to ensure that synchronization conflicts did not occur.

Although many of the various existing machine operations are useful for their intended applications, there is still room for improvement. For example, a more efficient non-blocking universal machine operation is needed. It would also be beneficial for such a machine operation to be less complex than previous machine operations. Another problem with the load_linked and store_conditional machine operations is that a slow processor might observe the data object in an intermediate, or inconsistent state. For example, under normal conditions a processor P and a processor Q might both read a pointer to a data object B. If the processor Q is a slower processor, and begins copying the data object B while the processor P is modifying the data object, then the copy of the processor Q might not be a valid copy. Although Q's subsequent store_conditional is certain to fail due to the modification of the data object, the processor Q might still try to store an out-of-range location, divide by zero, or perform some other unacceptable action. Another problem with the load_linked and store_conditional machine operations is that they only operate on a single word of data at a time, and, as a result, they are inadequate for use with data objects of multiple words.

BRIEF SUMMARY OF INVENTION

The present invention is directed to overcoming problems such as those set forth above. In a broad aspect, the invention comprises a system of coordinating the access of each one of a plurality of processors to multiple-element data objects in a memory shared by the processors. In a more particular aspect, the invention enables each of the processors to access and modify such data objects. A given processor may gain access to and modify a given data object by a series of steps in which the processor makes a copy of the data object, verifies that no other processor has modified the data object while the given processor was copying the object, modifies the copied object, verifies that no other processor has modified the object while the given processor was modifying the object, and finally substitutes the modified object for the given object. The copying and modification of the given object is performed in an area of shared memory separate from the memory area of the given object. Preferably, the separate memory area is associated with the given processor. Once the given object has been copied and modified to completion, processors desiring to modify the given object are directed to the address of the object in the separate area of shared memory rather than the original area of shared memory.

The verification system of the invention is an important feature of the invention inasmuch as the copying and modification of any given data object is implemented only if another processor has not already engaged in modifying the object. Thus, each object is provided with an indicator that gives the state of the object. The indicator in a preferred form comprises a first and a second counter that are incremented each time an object is modified by a processor.

To copy a data object, a processor reads the first counter, copies the data object, and then reads the second counter. If after reading the second counter, the counters are equal, the copy has been successful. Otherwise, the processor must re-attempt to copy the data object, after a selected delay. To modify a data object, a processor increments a scratch copy of the second counter, tentatively modifies the data object, and then increments a scratch copy of the first counter. The processor then checks the root pointer and the counters associated with the pointed data object. If those counters are equal after the tentative modification, the processor changes the address of the root pointer and proceeds to confirm the modification of the object. However, if the counters associated with the data object are unequal, the tentative modification is aborted, and the processor re-starts the process. Preferably, if a processor attempts to modify a data object while the object is being modified by another processor, the failed processor's re-attempt is delayed by a selected time period, to effectively stagger the processor's re-attempt with potential attempts of other failed processors.

DESCRIPTION OF DRAWINGS

The nature of the invention, as well as objects and advantages thereof, will become more apparent to those skilled in the art after consideration of the following detailed description in connection with the accompanying drawings, in which like reference numerals designate like parts throughout, wherein.

DESCRIPTION OF A PREFERRED EMBODIMENT

CONFIGURATION

Figure 1A:
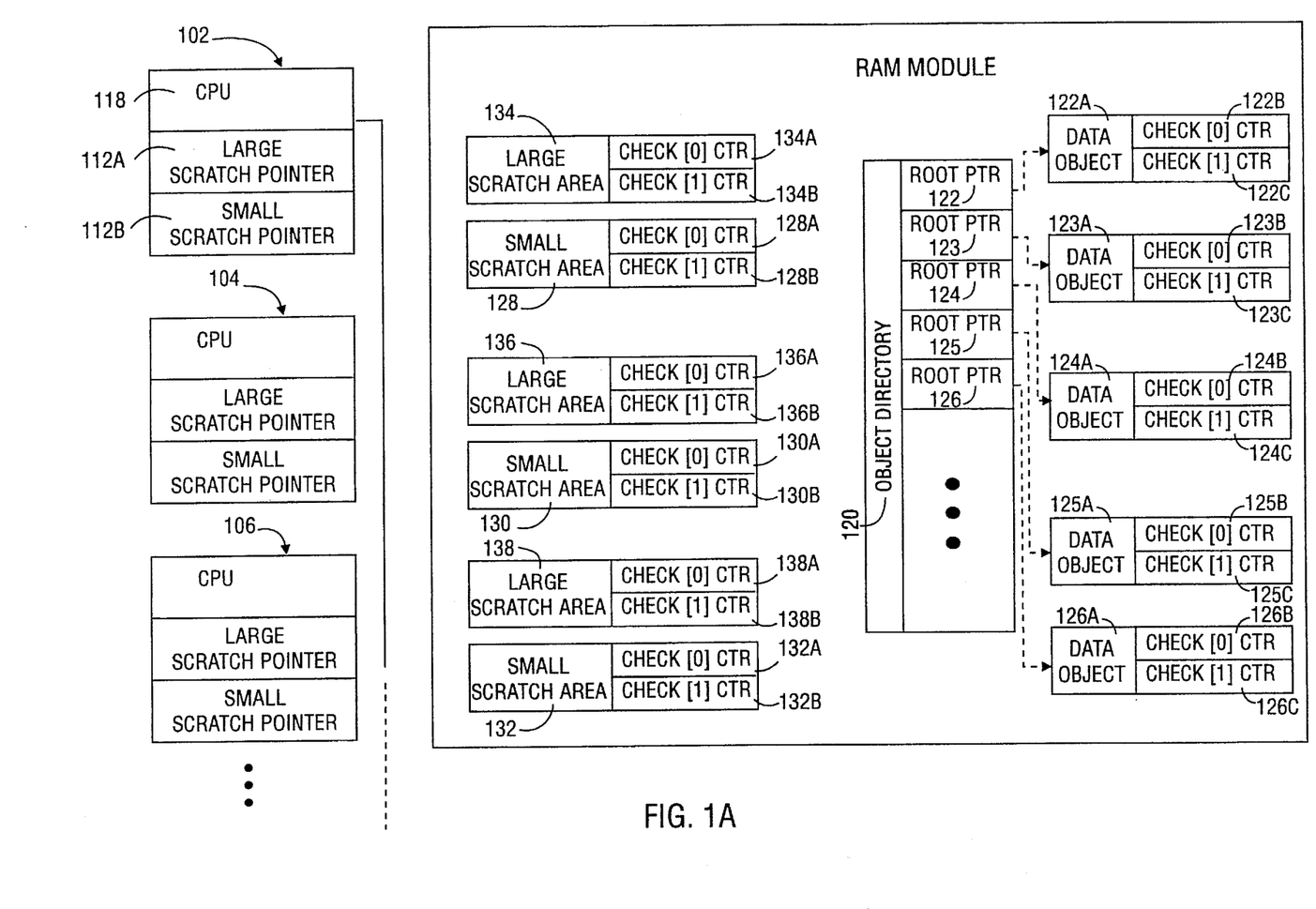
FIG. 1A is a block diagram illustrating the hardware components and interconnections of a typical electronic computing system 100 including a plurality of processors coupled to a shared random access memory module for implementing the present invention.

The method of the present invention may be implemented in a variety of electronic computing systems employing multiple processors. FIG. 1A shows a typical electronic computing system 100 utilizing a preferred embodiment of the present invention. The system 100 includes a first processor 102, a second processor 104, and a third processor 106. Each of the processors 102, 104, 106 is electrically connected to a random access memory (RAM) module 108 via a bus 110. The bus 110 comprises a standard wire bus, a network, or other device capable of interfacing the processors 102, 104, 106 to the RAM module 108. Each of the processors 102, 104, 106 includes a number of memory registers, including a small scratch pointer and a large scratch pointer. Each processor 102, 104, 106 also includes a central processing unit that supports load_linked and store_conditional machine operations. As an example, the arrangement of the first processor 102, which is representative of the arrangements of the other processors 104, 106, includes a small scratch pointer 112*a*, a large scratch pointer 112*b*, and a central processing unit 118.

The memory 108 includes an object directory 120 comprising a plurality of root pointers 122–126. The memory 108 additionally includes a number of data objects 122*a*, 123*a*, 124*a*, 125*a*, and 126*a*. Each data object 122*a*–126*a* comprises a linked list of data elements. Each root pointer contains the address of the first element of the data object to which that root pointer corresponds. For example, the root pointer 122 contains the address of the first element of the object 122a, the root pointer 123 contains the address of the first element of the object 123a, and so on. For ease of explanation, the number of data objects is static in the presently described system; accordingly, the number of root pointers and the number of objects is fixed. However, it is understood that the present invention also encompasses systems where the number of data objects is dynamic. Each data object of the invention additionally includes two counters: a check[0] counter and a check[ 1] counter. For example, the data object 122a includes a check[0] counter 122b and a check[ 1] counter 122c.

The memory 108 additionally includes small scratch areas 128, 130, 132, and large scratch areas 134, 136, 138. Scratch areas of two different sizes are provided in the present description to accommodate data objects occurring in two different sizes. However, if a particular application of the invention involves data objects of approximately uniform size, each processor need only use a single scratch area, of equal size with the scratch areas of the other processors. Likewise, if more than two sizes of data objects are utilized in an application, each processor will be associated with the appropriate number of properly sized scratch areas.

Each scratch area comprises a linked list, and corresponds to one of the processors 102, 104, or 106. For example, the processor 102 corresponds to the scratch areas 128 and 134, whose beginning addresses are indicated in the small and large scratch pointers 112a and 112b, respectively. Each of the processors may write to one small scratch area and one large scratch area; all of the scratch areas may be read by any of the processors 102, 104, 106. Each scratch area has a check[0] counter and a check[ 1] counter; for example, the scratch area 128 has a check[0] counter 128a and a check[ 1] counter 128b.

Figure 1B:
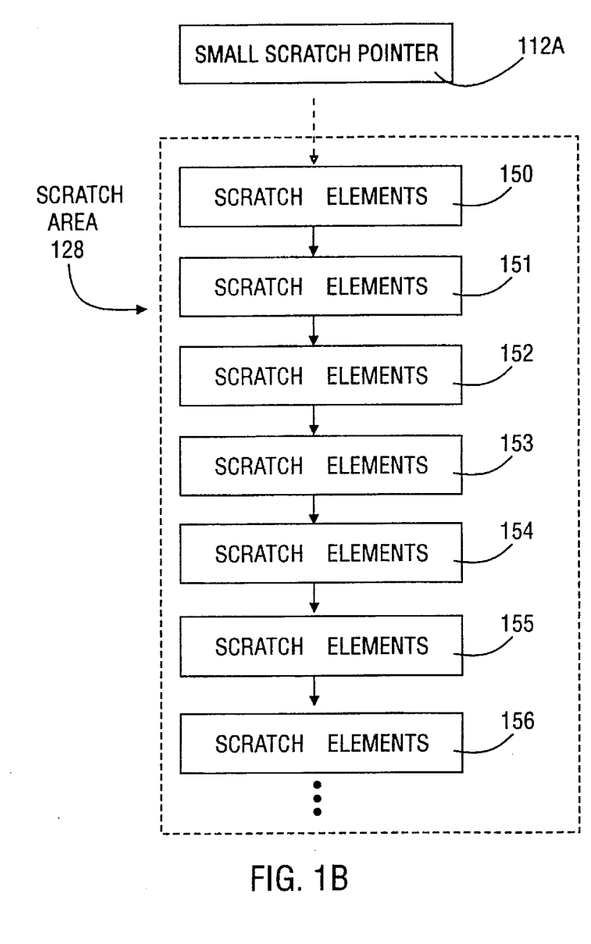
FIG. 1B is a block diagram illustrating the arrangement of a scratch area 128 in the shared memory module of the computing system shown in FIG. 1.

To illustrate the arrangement of a typical scratch area in greater detail, FIG. 1B shows the scratch area 128, which is made up of multiple scratch elements 150–56. Each of the elements 150–56 contains a data word (not shown) and a pointer (not shown) indicating the address of the next element. For example, the scratch element 150 contains a data word and the address of the scratch element 151, the scratch element 151 contains a data word and the address of the scratch element 152, and so on. The address of the first scratch element 150 is contained in the small scratch pointer 112a.

OPERATION

Figure 2:
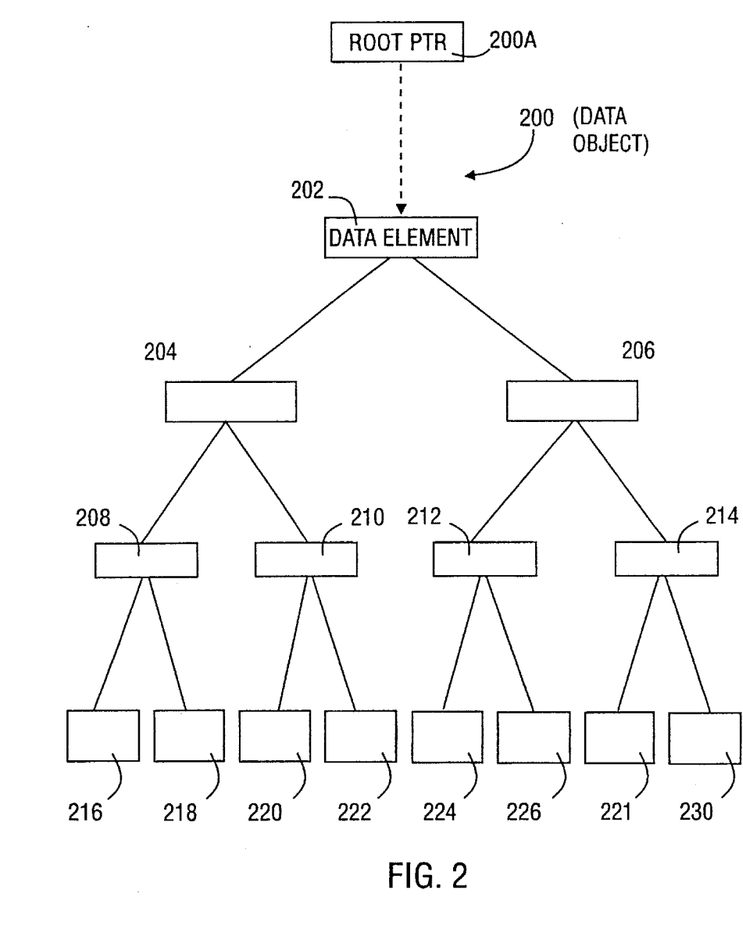
FIG. 2 is a diagram illustrating a first configuration of an exemplary data object 200 of the present invention.

The present invention is used to modify the contents of data objects in shared memory; each data object includes one or more data elements. For example, FIG. 2 shows a data object 200 that includes a plurality of data elements 202, 204, 206, etc. Each data element includes one data word (not shown) and pointers (not shown) indicating the addresses of subsidiary elements. For example, the element 202 includes pointers describing the addresses of the elements 204 and 206. A root pointer 200a contains the address of the first element 202 of the data object.

Figure 3:
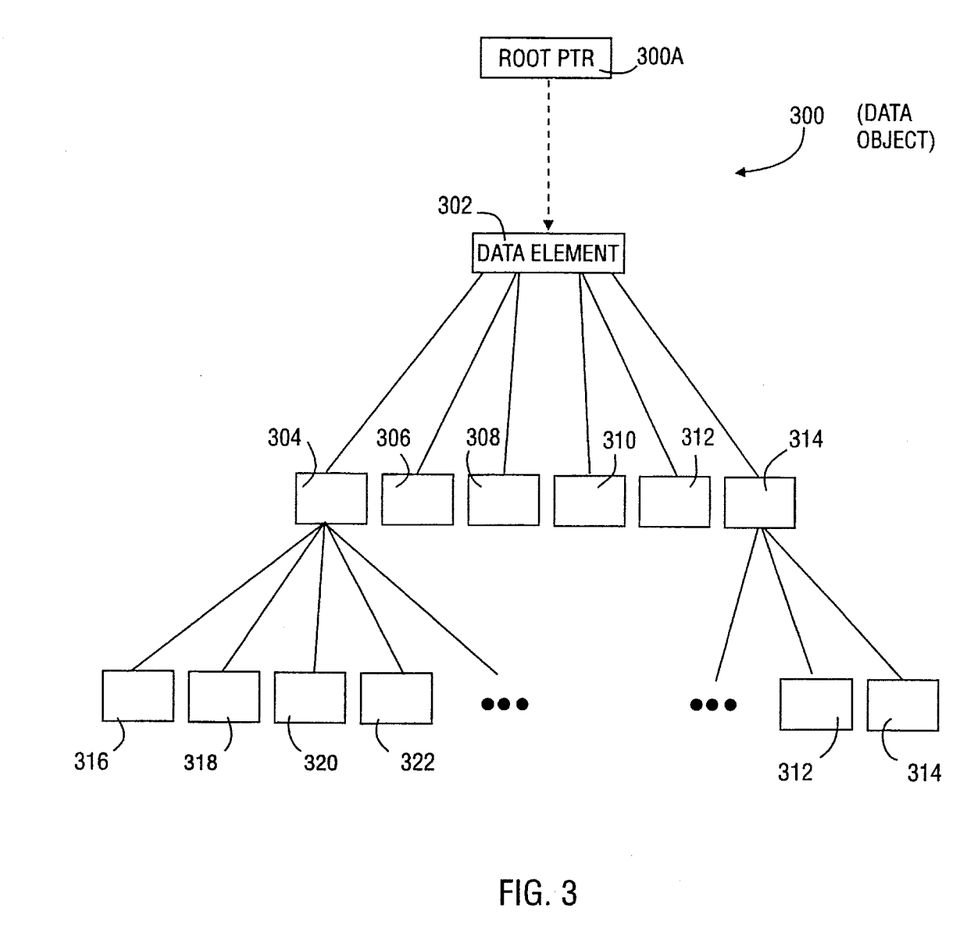
FIG. 3 is a diagram illustrating a second configuration of an exemplary data object 300 of the present invention.

A more complicated data object 300 is shown in FIG. 3. The data object 300 includes a plurality of elements 302, 304, 306, and so on. In the data object 300, each element includes a data word (not shown) and six pointers (not shown) to subsidiary elements. For example, the element 302 includes pointers indicating the addresses of elements 304, 306, 308, 310, 312, and 314. Likewise, each of the elements 304, 306, 308, 310, 312, and 314 includes six pointers to subsidiary elements. A root pointer 300a contains the address of the first element 302 of the data object 300.

Figure 4:
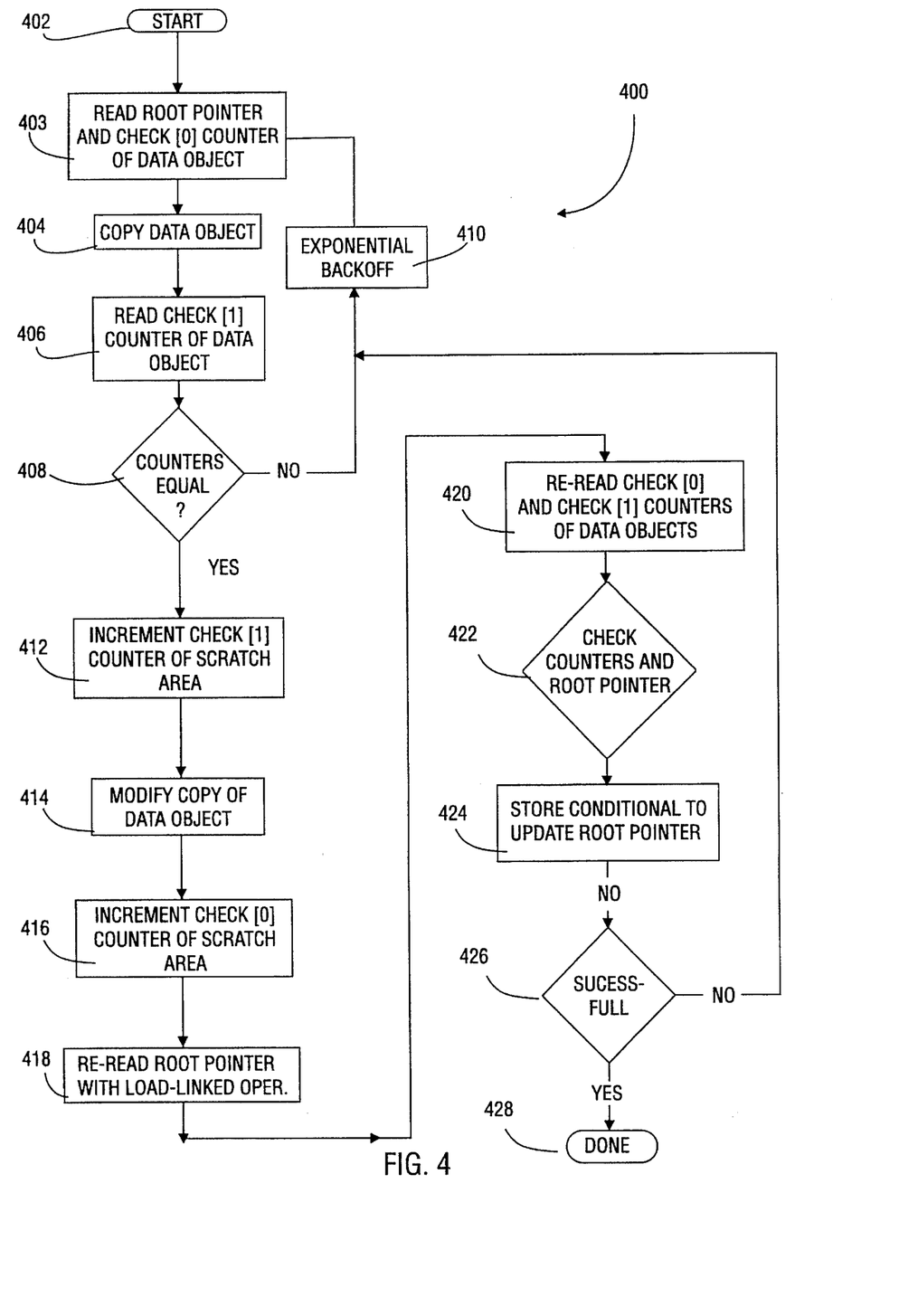
FIG. 4 is a diagram illustrating a routine 400 for modifying data objects in shared memory according to the method of the present invention.

As shown in FIG. 4, the present invention utilizes a routine 400 to modify data objects located in shared memory. The present invention is implemented by installing a computer program in a computer. Although an Encore Multimax™ brand computer is used in the described embodiment, it is understood that the present invention may also be implemented in a SEQUENT™ computer, a VAX™ multiple processor computer, a MIPS™ computer, a Digital Equipment Corporation ("D.E.C.")™ computer utilizing the ALPHA architecture, or other computers with multiple processors. An exemplary computer program for implementing the invention includes a number of C-language programming lines, which are the subject of copyright, and are shown in order of execution in the attached Appendix, which is incorporated herein.

The routine 400 functions to modify a data object by changing the contents of one or more elements of the data object. The modification of a data object in accordance with the present invention may include adding a number to the object, substituting other data into the object, performing combinations of mathematical and/or logical operations, or other desired modifications. In general, each of the processors 102, 104, 106 executes the steps of the routine 400 when that processor wishes to modify one of the data objects 122a–126a. The routine 400 is structured so that each processor attempting to modify a data object makes a number of checks to make sure that another processor has not already modified the data object; if, while one processor is modifying the data object, another processor completes its modification to the data object, the unsatisfied processor must start over. This guarantees that data object is never left in an inconsistent state, and that only one processor will succeed in modifying the data object. For ease of explanation, however, the following description of the routine 400 will discuss the modification of the data object 122a from the standpoint of the processor 102.

To modify the data object 122a, the processor 102 initiates the routine 400 in task 402. In task 403, the processor reads both the root pointer 122 and the check[0] counter 122b of the data object 122a (pointed to by the root pointer 122). Then, in task 404, the processor 102 copies the data object 122a into the small scratch area 128 or the large scratch area 134, depending upon the size of the data object 122a. For the present discussion, the data object will be assumed to be a "small" object, so that the small scratch area 128 will be used. In task 406, the processor 102 then reads the check[1] counter 122c.

If, in query 408, the processor 102 determines that the values read from the check[0] and check[1] counters 122b, 122c are unequal, this indicates that another processor has accessed the data object 122a between the time the processor 102 read the check[0] counter 122b and the time the processor 102 read the check[1] counter 122c. Thus, the data object 122c might be "inconsistent"; in other words, the data object 122c might have been modified by another processor while the processor 102 was performing its copy operation. In this case, the processor 102 performs an "exponential back-off" step 410 by first waiting for a randomly selected period of time, less than a first pre-selected upper limit, then re-starting at task 403. If, on the second attempt by the processor 102, query 408 again determines that the check[0] and check[1] counters 122b, 122c are unequal, the processor 102 performs another exponential back-off by waiting for a second randomly selected time, less than twice the first pre-selected upper limit. For each subsequent exponential back-off step 410, the upper limit is multiplied by two, and the delay time is randomly selected.

The exponential back-off 410 step is the preferred method to increase the odds that one processor will succeed in modifying a data object that other processors are also attempting to access. However, it is understood that the invention is not so limited. For example, each of the processors 102, 104, 106 might avoid repeated conflicts with other processors by utilizing a unique delay time when it is determined that a data object's counters are unequal.

If the query 408 determines that the check[0] and check[1] counters 122b, 122c are equal, indicating that the "version" of the data object copied in task 404 is current, the processor 102 in task 412 increments the check[1] counter 128b of the small scratch area 128. Then, task 414 performs the desired modifications to the copy of the data object in the small scratch area 128. After the copied data object is modified, the processor in task 416 increments the check[0] counter 128a of the small scratch area.

Then, the processor 102 in task 418 utilizes a load_linked operation to read the root pointer 122 of the data object 122a. In task 420, the processor 102 re-reads the check[0] and check[1] counters 122b, 122c. Query 422 determines whether the check[0] counter 122b and/or the check[1] counter 122c have been changed since they were initially read in tasks 403 and 406, or whether the root pointer 122 has been changed since it was read in task 403. If any of these has been changed, this indicates that the data object 122a has been modified by another processor. In this event, the processor 102 cannot properly complete its modification of the data object 122a since another processor has already modified the data object 122a. Accordingly, the processor 102 in task 410 performs an exponential back-off step 410 and re-starts in task 403. However, if query 422 determines that no changes have occurred, the version of the data object 122a is current, and the modification 424–428 by the processor 102 may continue.

The counters are intentionally read in one order when copying a data object, and incremented in the opposite order when modifying a data object. In particular, the check[0] counter 122b is first read in task 403 and the check[1] counter 122c is then read in task 406; however, the check[1] counter 128b is first incremented in task 412, and the check[0] counter 128a is incremented in task 416. This order is used to avoid the scenario shown in Table I.

Table I

1. Processor-A reads the check[0] counter of a data object.
2. Processor-B increments the check[0] counter of the data object, and modifies the data object.
3. Processor-A reads the check[1] counter of the data object.
4. Processor-B increments the check[1] counter of the data object.

In the scenario of Table I, the processor A might read an inconsistent version of the data object; however, the processor A will not realize a mistake has been made since the processor A perceives the check[0] and check[1] counters to be equal, despite the intermediate modification by the processor B. The routine 400 of the present invention avoids this possibility since the processors must read the check[1] counter before reading the check[0] counter.

In task 424, the processor 102 attempts a store_conditional operation to update the root pointer 122. Specifically, the store_conditional in task 424 determines whether the root pointer 122 has been modified since the root pointer was read in the load_linked operation of task 418. If the root pointer has been modified so that the store_conditional fails, this indicates that the data object 122a is no longer consistent. In other words, after the root pointer 122 was read in task 418, the root pointer 122 had been changed by another processor. In this event, control is passed to task 410 where the program performs an exponential back-off and re-starts in task 403.

On the other hand, if the store_conditional of task 424 is successful, task 424 "swings" the root pointer 122 to point to the address of the modified copy of the data object in the small scratch area 128. In addition, the prior address of the data object 122a is stored in the small scratch pointer 112a. Thus, the superceded version of the data object will be used as the small scratch area 128. Then, the routine ends in task 428.

The operation of task 414 can be illustrated in greater detail with reference to an example using FIGS. 1, 1A, and 2. The data object to be modified is the object 200; however, the only element of the object 200 which requires modification is element 224. Copying the entire object 200 into the scratch area 128, modifying the copy in the scratch area 128, and then "swinging" the root pointer to point to the newly modified copy would be inefficient, since most of the elements of the object 200 do not require any modification. Therefore, it is more efficient to copy only the elements to be changed into the scratch area 128, modify these elements as necessary, and then swing the root pointer to point to the modified copy in the scratch area 128.

This process first involves copying the elements positioned between the element(s) to be changed (element 224 in the present example) and the first element of the data object 200 (element 202) into the scratch area 128. Specifically, the contents of elements 202, 206, 212, and 224 are copied into corresponding scratch elements 150, 151, 152, and 153. Then, the data of the element 153 is modified as desired, and the pointer of the element 153, i.e. the pointer that points to the element 154, is deleted. Element 152 is then modified to point to the element 153, element 151 is modified to point to the element 152, and element 150 is modified to point to the element 151. Then, the root pointer 200a is changed to point to the element 150.

At this point, the data object 200 has been updated as desired. However, the scratch area 128 must be re-configured for possible future use. Particularly, the small scratch pointer 112a is filled with the address of the element 154, and the pointer of the final scratch element 156 is filled with the address of the element 202. Therefore, the elements 150–153 of the scratch area are effectively substituted into the object 200, and the elements 202, 208, 212, and 224 that have been superseded are effectively appended to the elements 154–156 of the scratch area 128.

TEST RESULTS

To measure the performance of the present invention, the operation of accessing a shared data object according to the method of the present invention was compared to the operation of a typical method of shared memory access that utilizes blocking. Specifically, the invention was compared to a "test-and-test-and-set spin lock" implementation, wherein mutual exclusion protocols are used such that each data object has an associated lock. In the "test-and-test-andset spin lock" implementation, a processor attempting to access a data object repeatedly reads the lock until the lock is free, and then the processor performs the test&set operation.

The implementations to be tested were constructed in C language on an ENCORE MULTIMAX™ computer with eighteen NS32532 processors. Since this computer architecture does not support the load_linked or store_conditional machine operations needed to implement the present invention, these machine operations were simulated using software. This reduced the efficiency of the present invention, since a successful store_conditional operation in the present tests required twelve machine operations, whereas the same operation would only require one machine operation if the computer hardware supported the store_conditional machine operation. However, the present tests are still instructive because it permits an approximate comparison of the relative efficiency of the present invention with a common blocking implemention.

Figure 5:
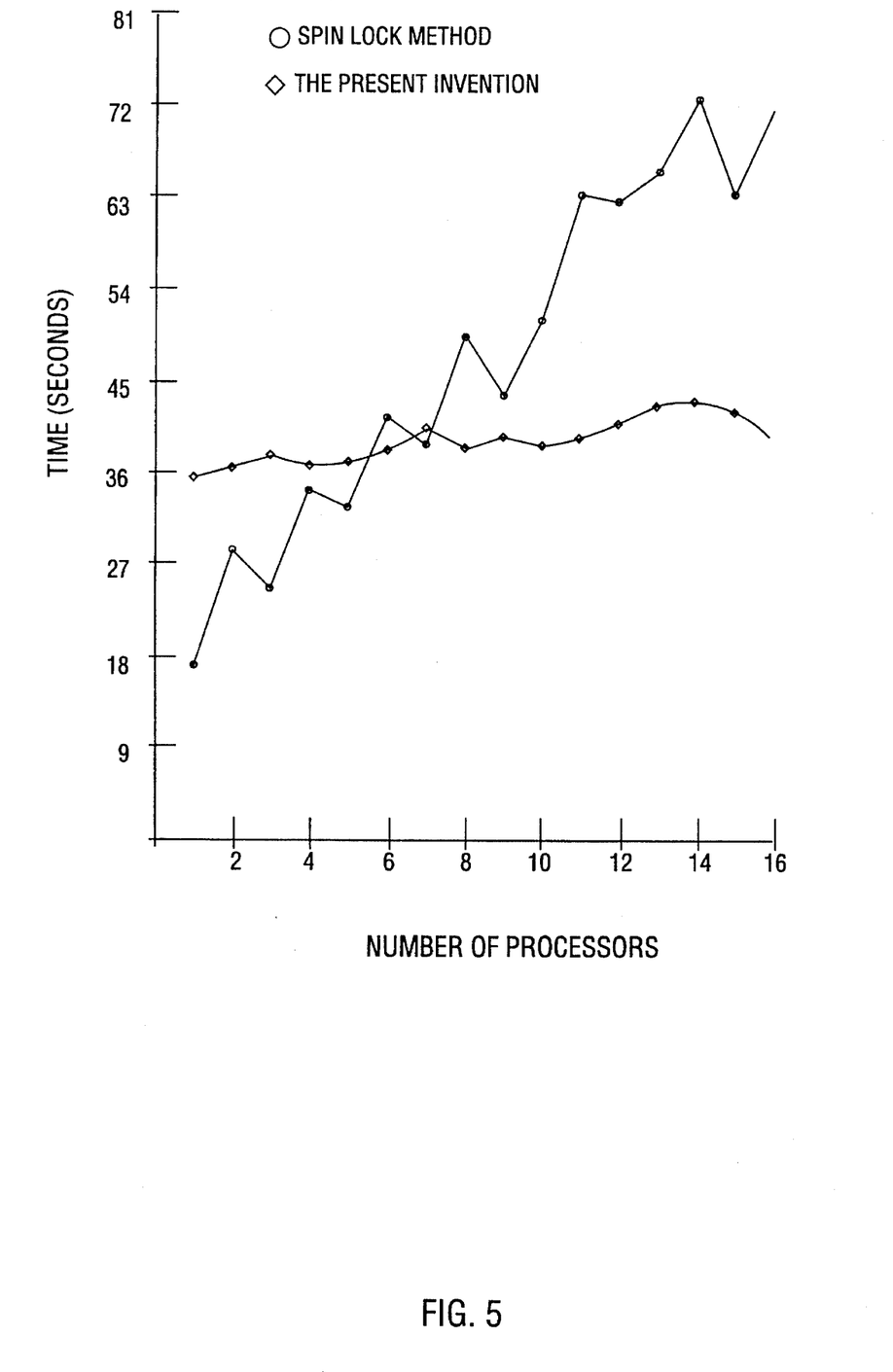
FIG. 5 is a graph illustrating the results of a test of the present invention for modifying data objects in a shared memory against a spin lock method.

The tests involved measuring, for each implementation under comparison, the elapsed time required for various numbers of processors to modify various numbers of objects contained in a shared memory. In particular, the tests measured the time required for $\eta$ processors to modify $2^{20}/\eta$ objects contained in a shared memory; $\eta$ was varied from 1 to 16 in integral steps. The objects to be modified comprised first-in-first-out (FIFO) queues; each modification of the test involved inserting a new element into the FIFO queue, and removing an old element from the FIFO queue. The results of the test are shown in FIG. 5. When the test involved fewer processors, thereby reducing memory contention, the test-and-test-and-set spin lock implementation completed the required modifications more quickly than the embodiment of the present invention. However, the present invention clearly required substantially less time to perform the required modifications in tests where more processors created more memory contention.

CONCLUSION

The present invention provides a number of advantages to its users. For example, in contrast to previous arrangements, the invention provides an exponential back-off feature that solves memory contention problems. Moreover, the invention avoids having to "lock" memory, by utilizing the load_linked and store_conditional machine operations and by utilizing various counters. Also, since the check[0] and check[1] counters are incremented in one order and read in the opposite order, the data object will always be consistent if the counters match. Furthermore, the invention operates efficiently since it only modifies the data elements that actually require modification. Additionally, the invention automatically establishes a new scratch area in memory by utilizing the elements of the old data object that were changed. Another advantage of the software of the present invention, apparent from the source code of the attached Appendix, is its conciseness; the software of the invention is thus easy to implement and efficient to operate.

While there have been shown what are presently considered to be preferred embodiments of the invention, it will be apparent to those skilled in the art that various changes and modifications can be made herein without departing from the scope of the invention as defined by the appended claims.

APPENDIX

```
int Object_Operate(Object_type **ROOT){
    Object_type *root, *new_root; /* private copies of root */
    int result, wait, backoff;
    unsigned first, last;
    while (TRUE) {
        root = *ROOT;                    /* Copy the root. */
        first = root—>check[0];          /* Pre-copy check */
        copy(root—>version, scratch—>version); /* Copy */
        last = root—>check[1];           /* Post-copy check */
        if (first == last) {  /* Ok? */
            /* Mark scratch inconsistent */
            scratch—>check[1]++;
            /* update version */
            result = object_operate(scratch—>version);
            /* Mark scratch consistent */
            scratch—>check[0] = scratch—>check[1];
            /* Recheck root and counters. */
            new_root = Load_Linked(ROOT);
            if ((new_root == root) && (last == new_root—>check[1]))
                /* Try to install new version */
                if (store_conditional(ROOT, scratch)) {
                    /* Success => reclaim new scratch
                    version */
                    scratch = root;
                    return result;
                }
        }
        /* Fail => exponential backoff */
        wait = random() % (01 << backoff);
        while (wait--);
        if (backoff < BACKOFF_MAX) backoff ++;
    }                                    /* end if */
}                                        /* end while */
/*           © 1992 Digital Equipment Corporation          */
/*                 All Rights Reserved                     */
```

What is claimed is:

1. A method of modifying an original data object that is located in a shared memory, the original data object having a memory address indicated by a first pointer, the shared memory being accessible by multiple processors, wherein each processor attempting to modify the original data object performs steps comprising:

(a) copying the original data object into a first memory area of the shared memory whose memory address is indicated by a second pointer;

(b) determining whether the original data object has been modified since the beginning of step (a), and if no such modification has occurred, proceeding to step (c); alternatively, starting over at step (a);

(c) modifying the copied data object;

(d) determining whether the original data object or the first pointer has been modified since step (a), and if neither has been modified, proceeding to step (e); otherwise starting over at step (a);

(e) modifying the first pointer to indicate the memory address of the first memory area; and (f) modifying the second pointer to indicate the memory address of the original data object.

2. The method of claim 1, wherein the step of copying the original data object includes the steps of:

(1) copying a first counter associated with the original data object before copying the original data object;

(2) copying the original data object;

(3) copying a second counter associated with the original data object after copying the original data object;

and wherein step (c) comprises the steps of:

(1) advancing the copy of the second counter;

(2) modifying the copy of the original data object in the first memory area;

(3) advancing the copy of the first counter.

3. The method of claim 1, wherein step (b) comprises the steps of:
   (1) reading a first counter associated with the original data object before copying the original data object,;
   (2) reading a second counter associated with the original data object after copying the original data object; and
   (3) determining whether the first and second counter readings reflect modification of the original data object, and if no such modification is reflected, proceeding to step (c); alternatively, starting over at step (1).

4. The method of claim 3, wherein step (d) comprises a step of determining whether the first and second counters match and whether the first pointer has been modified since step (a), and in the event the counters do match and the first pointer has not been so modified, proceeding to step (e); alternatively, starting over at step (a).

5. The method of claim 1, wherein the step of determining whether the first pointer has been modified comprises the steps of:
   (1) performing a load_linked operation to read the contents of the first pointer; and
   (2) comparing the contents read in step (1) to the contents of the first pointer prior to step (a).

6. The method of claim 5, wherein step (e) comprises the step of performing a store_conditional operation to store the memory address of the first memory area in the first pointer.

7. The method of claim 1, wherein the alternative of starting over at step (a) follows a randomly selected interval of time.

8. The method of claim 7, wherein the randomly selected interval of time is bounded by a selected upper limit.

9. The method of claim 8, wherein the selected upper limit is increased each time starting over at step (a) is required.

10. An apparatus for coordinating access to one or more data objects contained in memory, the apparatus comprising:
    multiple processors; and
    a shared memory including
      one or more counters corresponding to each data object, wherein each counter can be modified to indicate modification of the corresponding data object;
      one pointer corresponding to each data object, indicating the memory address of the data object in the shared memory;
      one or more first memory areas contained in the shared memory and corresponding exclusively to each of the processors, for receiving a copy of a data object for modification by the corresponding processor;
      one or more counters corresponding to each first memory area, wherein each counter can be modified to indicate a modification of that first memory area; and
      one pointer for each first memory area, indicating the memory address of the first memory area;
    wherein at least one of said processors includes:
      means for copying a data object into one of the first memory areas, and
      means for comparing and modifying the counters corresponding to each data object and the counters corresponding to each first memory area to coordinate access to each data object.

11. A method of modifying a data object in shared memory with a processor, the shared memory also being accessible by one or more other processors, wherein each processor attempting to modify the data object performs steps comprising:
    (a) reading the contents of a first root pointer, said first root pointer containing the address of the data object in the shared memory;
    (b) reading a data object check[0] counter associated with the data object;
    (c) copying the data object from the shared memory into a scratch memory area, the address of the scratch memory area being contained in a scratch memory pointer;
    (d) reading the data object check[1] counter associated with the data object;
    (e) determining whether the data object check[1] counter matches the data object check[0] counter, and proceeding with step (f) if the counters are equal, alternatively, starting over a step (a);
    (f) incrementing a scratch memory check[1] counter associated with the scratch memory area;
    (g) modifying the copy of the data object in the scratch memory area;
    (h) incrementing a scratch memory check[0] counter associated with the scratch memory area;
    (i) utilizing a load_linked machine operation to read the contents of the first root pointer;
    (j) determining whether the data object check[0] counter has changed since step (b), or whether the data object check[1] counter has changed since step (d), or whether the root pointer has changed since step (a), and proceeding with step (k) if no changes have occurred, otherwise starting over at step (a);
    (k) utilizing a store_conditional machine operation to attempt to replace the contents of the first root pointer with the contents of the scratch memory pointer; and
    (l) in the event the store_conditional stop (k) was successful, storing the replaced contents of the first root pointer as the scratch area pointer, alternatively, starting over at step (a).

12. The method of claim 11, wherein the alternative in steps (e), (j), and (l) of starting over at step (a) follows a randomly selected interval of time.

13. The method of claim 12, wherein the randomly selected interval of time is bounded by a selectively adjustable upper limit.

14. The method of claim 11, wherein the data object comprises a linked list of elements.

15. The method of claim 14, wherein step (c) comprises copying the following items into the scratch memory area:
    one or more elements of the data object to be modified;
    the first element of the data object; and
    all elements between the one or more elements to be modified and the first element of the data object.

16. A method of enabling any given one of a plurality of data processors to modify a given data object stored in a first memory area in a memory accessible by said plurality of processors, comprising:
    (a) causing the given processor to make a copy of the given data object into a second memory area;
    (b) verifying that the given data object has not been accessed by another of said processors since the commencement of step (a);
    (c) modifying the copy of the data object upon such verification, or failing such verification, repeating steps (a) and (b) after a period of time that changes at random for each successive such failure;

(d) again verifying that the dam object has not been accessed by another of said data processors following the modification in step (c); and (e) substituting the modified data object in the second memory area for the given data object in the first memory area upon such verification, or, failing such verification, repeating steps (a) through (d) after a period of time that changes at random for each successive such failure.

17. A method of modifying a data object located in a first memory area in a memory shared by multiple processors, wherein the first memory area has a scratch area, a first and a second counter, and the address of the first memory area is contained in a first pointer, comprising the steps of:

(a) reading the first counter;

(b) creating a copy of the data object in a second memory area in the shared memory, the second memory area having a third counter and a fourth associated therewith, the address of the second memory area being contained in a second pointer;

(c) reading the second counter;

(d) if the first and second counters do not indicate that the data object in the first memory area has been modified since step (a), incrementing the third counter and modifying the copy of the data object in the second memory area;

(e) incrementing the fourth counter;

(f) reading the first and second counters and the first pointer;

(g) if the first and second counters do not indicate that the data object in the first memory area has been modified since steps (a) and (c), respectively, and if the first pointer has not changed since step (a), swapping the values contained in the first and second pointers.

18. The method of claim 17, wherein step (g) further comprises the step of starting over at step (a) if the first and second counters indicate that the data object in the first memory area has been modified since steps (a) and (c), respectively, or if the first pointer has changed since step (a).

19. The method of claim 18, wherein said step of starting over at step (a) follows a randomly selected interval of time.

20. The method of claim 17, wherein step (d) further comprises the step of starting over at step (a) if the first and second counters indicate that the data object in the first memory area has been modified since step (a).

21. The method of claim 20, wherein the first and second counters indicate that the data object in the first memory area has not been modified if the first and second counter readings match each other.

22. The method of claim 20, wherein the step of starting over at step (a) follows a randomly selected interval of time.

* * * * *